Patented Dec. 17, 1946

UNITED STATES PATENT OFFICE 2,412,589

CONDENSATION PRODUCT AND METHOD OF PREPARING AND USING SAME

Eugene Lieber, West New Brighton, N. Y., assignor to Standard Oil Development Company, a corporation of Delaware No Drawing. Application December 19, 1942, Serial No. 469,579

13 Claims. (Cl. 252—59)

This invention relates to a novel type of condensation product and to methods of preparing such products and using them for various purposes, more particularly as pour depressors in waxy lubricating oils.

A pour depressor is a substance capable of lowering the temperature at which a hydrocarbon oil comprising a substantially homogeneous mixture of liquid hydrocarbons and waxy solids undergoes loss of fluidity. The expression "pour point" is used herein to mean the pour point as determined by the standard A. S. T. M. method.

Certain heavy-alkyl substituted aromatic hydrocarbon products are known to be pour depressors. It has also been proposed to improve such pour depressors by a subsequent resinification reaction, emphasizing the use of heavy-alkyl substituted aromatics by describing them as being made by condensation of aromatic hydrocarbons with "chlorinated aliphatic hydrocarbons of relatively high molecular weight—especially the paraffin waxes." It should be pointed out that the heavy-alkyl substituted aromatics used as starting materials in that process are in themselves pour depressors for lubricating oils.

On the other hand, it has also been suggested that pour depressors can be prepared by first resinifying an aromatic hydrocarbon and then alkylating the resultant product by condensing it with chlorinated high molecular weight aliphatic hydrocarbon material such as paraffin wax.

It has now been discovered, and is the primary feature of the present invention, that powerful and novel wax modifying agents useful particularly as pour depressors for waxy oils can be prepared which comprise essentially a reaction product of an aromatic compound, a resinifying agent capable of resinifying said aromatic compound, and a condensable aliphatic hydrocarbon compound of low molecular weight preferably having less than 7 carbon atoms. This result is distinctly unexpected and contrary to the above and many other teachings of the prior art.

The purposes of this invention can be accomplished in several different ways, depending essentially upon the order of reacting the several raw materials. According to one method, which for the sake of simplicity will be referred to as method A, the low molecular weight aliphatic hydrocarbon groups are first condensed with an aromatic compound to make an alkylated aromatic compound having at least one alkyl substituent group containing less than 7 carbon atoms, and subsequently resinifying said product by treatment with a suitable resinifying agent, as for instance an aldehyde. On the other hand, according to method B, the aromatic compound is first resinified, as by reaction with an aldehyde, and then the resulting product is alkylated with a low molecular weight aliphatic hydrocarbon group containing less than 7 carbon atoms, as, for instance, by condensation with amyl chloride. It should be understood that no invention is claimed herein as to the first step of either method A or B but only in making the final reaction product. A third method C comprises simultaneous reaction of all three separate constituents, i. e., an aromatic compound, a resinifying agent capable of resinifying said aromatic compound, and a condensable aliphatic hydrocarbon compound of low molecular weight, preferably having less than 7 carbon atoms.

That the present invention obtains new and unexpected results is clear from the fact that in method A the alkylated aromatic compound to be resinified does not per se have any substantial pour depressing properties, and only attains such properties as a result of the subsequent resinification. On the other hand, in method B the resinified aromatic compound first formed is likewise not a pour depressor and in some cases is not even soluble in mineral oil, and the desired characteristics of suitable oil-solubility and pour depressing properties are not imparted until the subsequent alkylation.

Another outstanding advantage of the present invention is that the low molecular weight aliphatic hydrocarbon compounds used in preparing the products of this invention are available in large, substantially limitless, quantity and at relatively low cost; whereas the high molecular weight aliphatic compounds used heretofore are available only in relatively limited quantities and at a cost which at times is relatively high, in view of the great demand for such high molecular weight products in other fields.

The aromatic compounds to be used according to the present invention may comprise only one or mixtures of a number of different types of mono-, di- and other poly-nuclear aromatic hydrocarbons or hydroxy, amino and other substituted derivatives thereof capable of being resinified by the resinifying agents to be mentioned further on. Some specific examples of suitable aromatic compounds are benzene, naphthalene, anthracene, phenanthrene, di-phenyl, toluene, phenol, cresol, alpha- and beta-naphthol, aniline, naphthylamine, and the line.

The low molecular weight condensable aliphatic hydrocarbon compounds to be used may be selected from the group consisting of the aliphatic halides, especially the mono-halogen substituted aliphatic hydrocarbons, or olefins corresponding thereto, such as would be obtained by dehydrohalogenation thereof. Specific examples are amyl chloride, hexyl chloride, butyl chloride, isobutyl chloride, and even lower alkyl halides, such as the propyl, ethyl and methyl chlorides, although it is preferred to use those having from 4 to 6 carbon atoms.

Although the halogen substituent is preferably chlorine from practical considerations, the other corresponding halides may be used such as bromides and iodides, the fluorides being in most cases somewhat too stable to give the desired reaction. Instead of using any single compound, mixtures of two or more may be used, such as the mixed amyl chlorides available on the market as a commercial product, comprising essentially a mixture of primary, secondary and tertiary amyl chlorides; or other mixed products such as the chlorides obtained by simultaneous chlorination of a mixture of hydrocarbon gases containing 4, 5 and 6 carbon atoms.

The resinifying agents to be used according to the present invention may be those which are already known to the art, including particularly the aldehydes, such as formaldehyde, or products comprising the same, such as tri-oxymethylene or others such as acetaldehyde, propanaldehyde and the like, or other types of resinifying agents, such as sulfur halides, elementary sulfur, and so forth.

In carrying out the invention according to method A, the alkylated aromatic compound to be used may either be obtained as such from a suitable source or may be manufactured especially for the purposes of this invention, in which case suitable aromatic compounds, such as those mentioned above, should be condensed with a suitable low molecular weight aliphatic hydrocarbon compound, such as amyl chloride or amylene, preferably by use of a Friedel-Crafts condensing agent, e. g., aluminum chloride, boron fluoride, zinc chloride, ferric chloride, titanium tetrachloride, boron trichloride, and so forth; or, in some cases anhydrous hydrogen fluoride or mixtures thereof.

Condensations are preferably, although not necessarily, carried out in the presence of a solvent or diluent, such as a refined naphtha or kerosene, or a chlorinated hydrocarbon compound, such as tetrachlorethane, dichlorbenzene, or others such as carbon disulfide, nitrobenzene, and so forth; if a solvent is used, the amount thereof should be about one to five times the volume of the reaction. The temperature should be between the approximate limits of room temperature and about 300° F., preferably about 150° to 200° F. The time of reaction varies inversely with the temperature used and should be about one-half to five hours, preferably one to two hours.

After the Friedel-Crafts condensation has been completed, the reaction mixture is cooled, preferably diluted with an inert liquid such as a refined kerosene, and neutralized by pouring into a mixture of alcohol and water. After settling, the kerosene extract is distilled to remove unreacted raw materials and to obtain the desired alkylated aromatic compounds as a distillation residue.

The final resinification reaction of method A is also carried out in the presence of catalysts such as sulfuric acid, aluminum chloride, zinc chloride, acetic acid, phosphoric acid, phosphoric anyhydride, etc. The use of a solvent or diluent, as mentioned above in connection with the preliminary Friedel-Crafts condensation, is optional and preferable, although not necessary. The resinification reaction is also carried out under approximately the same temperature conditions as the above Friedel-Crafts condensation, although the temperature to be used for optimum results varies with the nature and amount of the various reactants being used. The time required is usually about one-half to two hours, one hour being sufficient in most cases. The amount of catalyst to be used varies according to the nature and quantities of reactants used and also depends to some extent upon the quality and quantity of product desired, the yield being generally directly proportional to the amount of catalyst used, up to a certain optimum amount, decreasing gradually therefrom. Sometimes products having the most potent pour-depressing effects are produced under conditions giving relatively small yields, but this is not always true.

By carrying out the invention according to method B, the aromatic compounds can first be resinified by treating with one of the various resinifying agents, or others known to the art, and then the resulting resinous products can be subjected to a Friedel-Crafts condensation with a lower molecular weight aliphatic hydrocarbon compound, such as amyl chloride or amylene, in substantially the same manner as described above in the preliminary stage of method A. However, in method "B," the alkylation reaction temperature should be above 125° F., preferably above 150° F., because at lower temperatures the resulting products are oil-soluble but are not pour depressors.

Particularly in method B, and preferably also in method A, the final reaction product is recovered by distilling off the low boiling constituents thereof and from solution in a suitable inert solvent such as highly refined kerosene, by distillation under reduced pressure, e. g., with fire and steam, or under vacuum at an absolute pressure as low as 100 mm., preferably as low as 20 mm. mercury, to about 600° F., leaving as a distillation residue the desired reaction products having wax modifying properties.

The reaction product of this invention is usually a more or less brittle resin, especially when made by method B, ranging from a yellowish to a dark-brown color, although sometimes it has a greenish color, and in a few instances it is more of a viscous oil than a solid.

The product of this invention has the property of modifying the crystal structure of waxes such as paraffin wax present when added to compositions containing same. For instance, when about .05–10.0%, preferably 0.2–5.0%, of this wax modifier is added to a waxy lubricating oil such as a Pennsylvania type lubricating oil having a relatively high pour point, the resultant blend will have a substantially lower pour point; in other words, this wax modifier is an effective pour depressor for waxy oil. A small amount of this wax modifier is also useful as a dewaxing aid for removing wax from mineral lubricating oils of undesirably high wax content. In similarly small amounts, this wax modifier may also be incorporated into paraffin wax or compositions containing the same to be used for various purposes such as for coating or impregnating paper, etc. or for making various molded products.

The invention will be better understood from a consideration of the following examples, which are given for illustration only.

METHOD A

Example 1

100 grams of mono-amyl naphthalene and 16 grams of trioxymethylene were suspended in 100 cc. of glacial acetic acid and 115 grams of concentrated sulfuric acid was slowly added to the reaction mixture with vigorous shaking and cooling. After the addition of the sulfuric acid, the reaction mixture was heated to 122° F. and maintained thereat for 45 minutes. Water was then added and the resinous material extracted with kerosene. After washing, the kerosene extract was distilled with fire and steam to 600° F. in order to remove solvent and low-boiling products. A bottoms residue comprising 84 grams of a green viscous oil was obtained as product.

When 5% of this resinification product was added to a waxy-oil, the pour point of which was +30° F., the pour point was found to be —15° F.

*Example 2*

100 grams of mono-amyl naphthalene and 16 grams of trioxymethylene were suspended in 100 cc. of a highly pretreated kerosene. 10 grams of anhydrous aluminum chloride was then added to the reaction mixture with suitable agitation. After the addition of the AlCl₃, the temperature was increased to 175° F. and maintained thereat for one hour. After cooling, the reaction mixture was diluted with 500 cc. further of kerosene and neutralized by pouring into a mixture of alcohol and water. After settling, the kerosene extract was distilled with fire and steam to 600° F. in order to remove solvent and low-boiling products. A bottoms residue comprising 32 grams of a dark-brown brittle resin was obtained as product.

When 2% of this resinification product was added to a waxy-oil, the pour point of which was +30° F., the pour point was found to be —10° F.

*Example 3*

The following reagents were taken in the proportions indicated:

Mono-amyl naphthalene _____ grams __ 100
Trioxymethylene _____ do ____ 16
Kerosene as solvent _____ cc __ 100
AlCl₃ _____ grams __ 50

The procedure for carrying out the reaction was the same as described in Example 2. The product was recovered as before by diluting with kerosene and neutralizing with a mixture of alcohol and water. After settling, the kerosene extract was distilled with fire and steam to 600° F. in order to remove the solvent and low-boiling products. A bottoms residue comprising 61 grams of a dark-brown resinous material was obtained as product.

When 2% of this resinification product was added to a waxy-oil, the pour point of which was +30° F., the pour point was found to be 0° F.

*Example 4*

The following reagents were used in the proportions indicated:

Mono-amyl naphthalene _____ grams __ 100
Trioxymethylene _____ do ____ 16
AlCl₃ _____ do ____ 70
Kerosene as solvent _____ cc __ 100

The procedure for carrying out the reaction and for recovery of product was the same as described in Example 2. A bottoms residue comprising 96 grams of a dark-brown resinous material was obtained as product.

When 2% of this resinification product was added to a waxy-oil, the pour point of which was +30° F., the pour point was found to be —10° F.

*Example 5*

The following reagents were used in the proportions indicated:

Mono-amyl benzene _____ grams __ 100
Trioxymethylene _____ do ____ 16
Kerosene as solvent _____ cc __ 100
AlCl₃ _____ grams __ 10

The procedure for carrying out the reaction and for recovery of product was the same as described in Example 2. A bottoms residue comprising 17 grams of a dark-brown resinous material was obtained as product.

When 1% of this resinification product was added to a waxy-oil, the pour point of which was +30° F., the pour point was found to be —10° F. When 2% of this resinification product was added to the same waxy-oil a pour point of —25° was obtained.

METHOD B

*Example 6*

A highly aromatic kerosene is converted to a clear brittle resinous mass by treatment with paraformaldehyde in the presence of acetic acid and a small quantity of concentrated sulfuric acid.

50 grams of the kerosene-formaldehyde resin was dissolved in 100 cc. of tetrachlorethane as solvent. To this was added 60 grams of the mixed amyl chlorides of commerce. 10 grams of AlCl₃ were now slowly added to the reaction mixture with suitable agitation and maintaining the reaction temperature at 80–90° F. After the addition of the AlCl₃ the reaction mixture was heated to 180° F. and maintained thereat for 2 hours. After cooling, the reaction mixture was diluted with kerosene and neutralized with a mixture of alcohol and water. After settling, the kerosene extract was distilled with fire and steam to 600° F. to remove solvent and low-boiling products. A bottoms residue, comprising 36 grams of a dark-green brittle resinous material was obtained as product. It was found to be freely soluble in mineral lubricating oil.

When 1% of this condensation product was added to a waxy-oil, the pour point of which was +30° F., the pour point was found to be —15° F.

*Example 7*

The following reagents were taken in the proportions indicated:

Grams
Kerosene-formaldehyde resin _____ 50
Mixed amyl chlorides _____ 120
AlCl₃ _____ 25

The procedure was the same as described in Example 6. Tetrachlorethane was used as solvent.

43 grams of a dark-green resinous substance was obtained as reaction product. It was found to be freely soluble in mineral lubricating oil.

When 1% of this condensation product was added to a waxy-oil, the pour point of which was +30° F., the pour point was found to be —10° F.

*Example 8*

A naphthalene-formaldehyde resin was prepared as follows:

128 grams of naphthalene and 15 grams of trioxymethylene weer suspended in 150 cc. of glacial acetic acid. 75 cc. of concentrated sulfuric acid were slowly added, with suitable agitation and cooling to room temperature. After the addition of the sulfuric acid, the reaction mixture was heated to 125–150° F. and maintained thereat for 1 hour. A mixture of water and alcohol was then added and the resinous material was extracted with benzene. After washing, the benzene extract was distilled with fire and steam to 600° F. to remove solvent and unreacted naphthalene. A bottoms residue of 80 grams of a clear yellow resinous material was obtained as product. This material was found to be very difficultly soluble in mineral lubricating oil and to have no pour depressor properties for waxy oils.

50 grams of naphthalene-formaldehyde resin, prepared as described above was condensed with 60 grams of mixed amyl chlorides in the presence of 10 grams of $AlCl_3$ and using 150 cc. of tetrachlorethane as solvent. The procedure and recovery of product was essentially that as described in Example 6.

50 grams of a dark resinous material was obtained as product. It was found to be freely soluble in mineral lubricating oil.

When 2% of this condensation product was added to a waxy-oil, the pour point of which was +30° F., the pour point was found to be −5° F.

Other aromatic hydrocarbon-formaldehyde resins may be used in place of the resins employed in the examples disclosed above. Thus, for instance, the formaldehyde resin of anthracene, benzene, phenanthrene, fluorene, diphenyl, toluene, xylene, and the like, or the formaldehyde resins of mixtures of any of these aromatic hydrocarbons may be used, or other aldehyde resins of naphthalene, or of the aromatic hydrocarbons referred to above, such as naphthalene-acetaldehyde resins, anthracene-acetaldehyde resin, etc. may be used, or the corresponding sulfur resins of these same compounds. The method of preparing these other resins is in general as described above.

The proportions in which the various raw materials should be combined to make the novel wax modifying agents of this invention, vary to a substantial extent as indicated in the above experimental examples, but in general it may be said that for one mole of aromatic compound, one-half to five moles of low molecular weight aliphatic hydrocarbon compounds should be used and about one-half to two moles of the resinifying agent. In Method B for every one part by weight of resinified aromatic compound used, the amount of alkyl chloride should be about ½ to 3 parts by weight, or equivalent amounts, of other alkyl halides or corresponding olefines.

For the sake of convenience, the experimental data in Examples 1 to 8 are summarized in the following table.

TABLE

Method A

| Test No. | Alkyl-arom., name | Hc., gm. | Resinifying agt. Name | Resinifying agt. Gm. | Solvent Name | Solvent Cc. | Cat., temp., time | Cat., temp., time Gm. | Cat., temp., time °F. | Cat., temp., time Hrs. | Yield, gm. | °F. pour point of blend,[1] per cent added 1 | °F. pour point of blend,[1] per cent added 2 | °F. pour point of blend,[1] per cent added 5 |
|---|---|---|---|---|---|---|---|---|---|---|---|---|---|---|
| 1 | Amyl naphthalene. | 100 | Trioxy-methylene | 16 | Acetic acid | 100 | $H_2SO_4$ | 115 | | ¾ | 84 | | | −15 |
| 2 | do | 100 | do | 16 | Kerosene | 100 | $AlCl_3$ | | 175 | 1 | 32 | | −10 | |
| 3 | do | 100 | do | 16 | do | 100 | do | 50 | 175 | 1 | 61 | | 0 | |
| 4 | do | 100 | do | 16 | do | 100 | do | 70 | 175 | 1 | 96 | | −10 | |
| 5 | do | 100 | do | 10 | do | 100 | do | 10 | 175 | 1 | 17 | −10 | −25 | |

Method B

| Test No. | Arom.-resin Name | Arom.-resin Gm. | Alkyl Name | Alkyl Gm. | Solvent Name | Solvent Cc. | Cat., temp., time | Cat., temp., time Gm. | Cat., temp., time °F. | Cat., temp., time Hrs. | Yield, gm. | °F. pour point of blend,[1] per cent added 1 | °F. pour point of blend,[1] per cent added 2 | °F. pour point of blend,[1] per cent added 5 |
|---|---|---|---|---|---|---|---|---|---|---|---|---|---|---|
| 6 | Kerosene-aromatic formaldehyde. | 50 | Amyl chloride | 60 | Tetrachlor-ethane | 100 | $AlCl_3$ | 10 | 180 | 2 | 36 | −15 | | |
| 7 | do | 50 | do | 120 | do | 100 | do | 10 | 180 | 2 | 43 | −10 | | |
| 8 | Naphthalene formaldehyde. | 50 | do | 60 | do | 150 | do | 10 | 180 | 2 | 50 | | −5 | |

[1] Pour point of original oil was 30° F.

Thus according to the present invention, a low molecular weight alkyl aromatic compound, such as amyl naphthalene, which per se has no pour-depressing properties, is converted by resinification as with trioxymethylene, into an active pour depressor; and similarly, resinified aromatic compounds, e. g., a naphthalene formaldehyde resin, which per se has little, if any, utility in lubricating oils, are converted into active pour depressors by alkylation with low molecular weight alkyl groups, such as by condensing with amyl chloride.

Method A of this invention and its resulting product are claimed in application, Ser. No. 354,144, filed August 24, 1940, now issued as Patent No. 2,384,107 of September 4, 1945, of which the present application is a continuation-in-part; and Method C, the simultaneous reaction of all three constituents and its resulting product are claimed in co-pending application Ser. No. 469,351, filed December 17, 1942.

It is not intended that this invention be limited to any of the specific examples which were given merely for the sake of illustration nor to any theory as to the mechanism of the operation of the invention but only by the appended claims in which it is intended to claim all novelty inherent in the invention as broadly as the prior art permits.

I claim:

1. Process which comprises alkylating a resinified material derived by resinifying an aromatic hydrocarbon with an aldehyde, with an alkylating agent containing less than 7 carbon atoms, at a temperature above about 125° F., with a Friedel-Crafts catalyst, hydrolyzing and removing the catalyst and distilling the reaction product under reduced pressure to about 600° F. to obtain the desired product as distillation residue.

2. Process according to claim 1 in which an aromatic kerosene aldehyde resin is alkylated with amyl chloride.

3. Process of preparing wax modifying agents, which comprises alkylating about one part by weight of an aromatic-kerosene formaldehyde resin with about ½ to 3 parts by weight of amyl chloride at a temperature of about 125–200° F. in the presence of aluminum chloride as a catalyst and in the presence of tetrachlorethane as solvent, for a reaction time of about ½ to 5 hours, hydrolyzing and removing the catalyst and distilling the reaction products under reduced pressure to about 600° F. to obtain the desired distillation residue having wax modifying properties.

4. Process which comprises alkylating a naphthalene-formaldehyde resin with at least one alkyl group containing less than 7 carbon atoms, at a temperature above about 125° F. with a Friedel-Crafts catalyst, hydrolyzing and removing the catalyst and distilling the reaction product under reduced pressure up to about 600° F. to obtain the desired products as distillation residue.

5. Product comprising essentially an oil soluble resin, substantially non-volatile up to about 600° F., and having pour depressing properties, such product being a resin derived by resinification of an aromatic hydrocarbon by an aldehyde, which has been subjected to Friedel-Crafts alkylation at a temperature above about 125° F. with an alkylating agent containing less than 7 carbon atoms.

6. Product consisting essentially of an oil soluble resin, substantially non-volatile up to about 600° F., and having pour depressing properties when dissolved in waxy mineral lubricating oils in small amounts, said product being an aromatic-kerosene formaldehyde resin which has been condensed with amyl chloride at a temperature above 125° F.

7. A composition comprising a major proportion of a hydrocarbon oil and a small but pour-depressing amount of a product defined in claim 5.

8. A composition comprising a major proportion of a waxy mineral lubricating oil, a pour depressing amount of a kerosene aromatic-formaldehyde resin which has been amylated to impart oil-soluble and pour depressing properties thereto.

9. Process according to claim 1 in which the alkyl group contains 4 to 6 carbon atoms.

10. Product according to claim 5 in which the alkyl group contains 4 to 6 carbon atoms.

11. Process which comprises reacting an aromatic hydrocarbon-aldehyde resin with an alkylating agent selected from the class consisting of alkyl halides and corresponding olefins, having less than 7 carbon atoms, at a temperature above about 125° F. with a Friedel-Crafts catalyst, hydrolyzing and removing the catalyst and distilling the reaction products under reduced pressure to about 600° F. to obtain the desired product as distillation residue.

12. Process which comprises reacting an aromatic hydrocarbon-formaldehyde resin with an alkyl halide having less than 7 carbon atoms at a temperature above about 125° F. with aluminum chloride as catalyst, hydrolyzing and removing the catalyst and distilling the reaction products under reduced pressure to about 600° F. to obtain the desired product as distillation residue.

13. Process which comprises reacting an aromatic kerosene-formaldehyde resin with an alkyl halide having less than 7 carbon atoms at a temperature above about 125° F. in the presence of an inert solvent and with aluminum chloride as catalyst, hydrolyzing and removing the catalyst and subjecting the reaction products to fire and steam distillation up to 600° F. to obtain the desired product as distillation residue.

EUGENE LIEBER.